US006948312B1

(12) United States Patent
Goldasz et al.

(10) Patent No.: US 6,948,312 B1
(45) Date of Patent: Sep. 27, 2005

(54) HIGH-PERFORMANCE PISTON CORE FOR A MAGNETORHEOLOGICAL DAMPER

(75) Inventors: Janusz P. Goldasz, Cracow (PL); Zbigniew W. Szklarz, Zator (PL); Alexander A. Alexandridis, Orchard Lake Village, MI (US); Thomas W. Nehl, Shelby Township, MI (US); Fang Deng, Novi, MI (US); Olivier Valee, Paris (FR)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/811,516

(22) Filed: Mar. 29, 2004

(51) Int. Cl.[7] .......... F16D 37/02
(52) U.S. Cl. .......... 60/326; 188/267
(58) Field of Search .......... 60/326; 188/267; 92/257, 258

(56) References Cited

U.S. PATENT DOCUMENTS 5,947,238 A * 9/1999 Jolly et al. .......... 188/267.2
6,655,511 B1 * 12/2003 Lun et al. .......... 188/267

* cited by examiner

*Primary Examiner*—Edward K. Look
*Assistant Examiner*—Michael Leslie
(74) *Attorney, Agent, or Firm*—Michael D. Smith

(57) ABSTRACT

A high-performance piston core including a first piston cylinder and a second piston cylinder, with a piston center longitudinally disposed between and magnetically coupling the first piston cylinder and the second piston cylinder. The piston center is made of high-performance magnetic material, such as Cobalt steel (CoFe), Silicon steel (SiFe), Vanadium/Cobalt steel (Permendur), alloys thereof, or the like. The high-performance magnetic materials exhibit high magnetic permeability and reduce the magnetic reluctance of flux bottlenecks. In addition, high-performance magnetic materials typically saturate at a higher flux density than the conventional magnetic materials. The first piston cylinder and the second piston cylinder can be made of conventional magnetic material, such as low-carbon steel. The first piston cylinder can include a ring disposed about an end, where the end is longitudinally attached and magnetically coupled to the piston center.

26 Claims, 8 Drawing Sheets

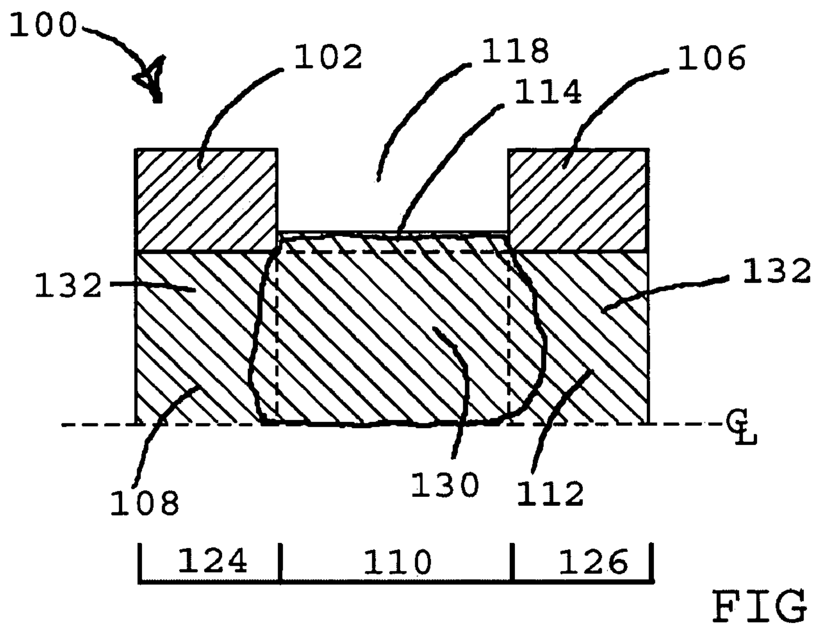
FIG. 4
FIG. 5
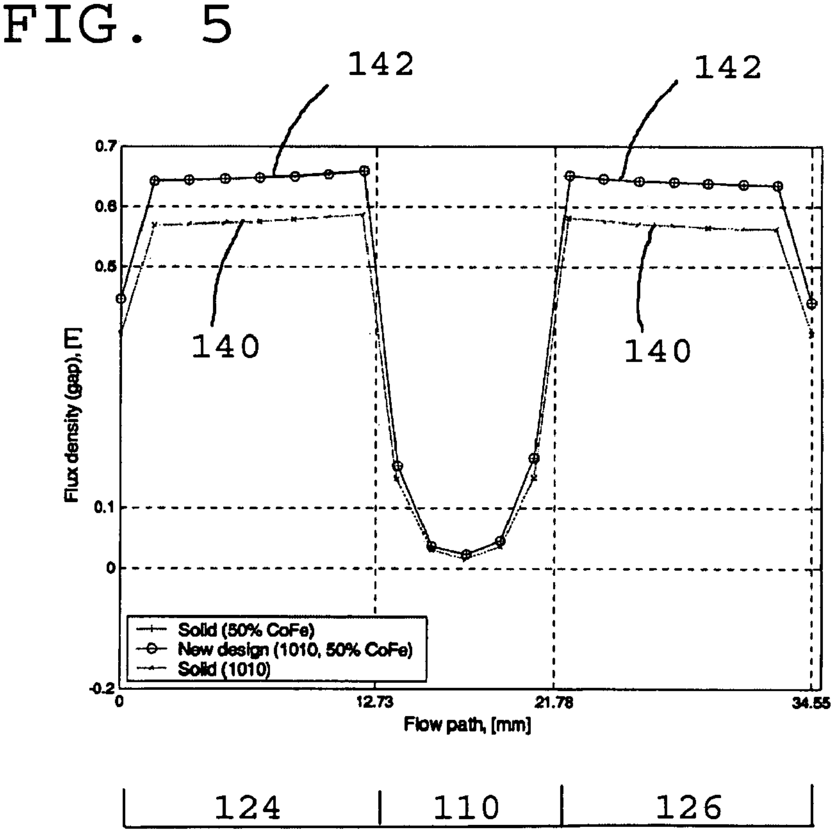

HIGH-PERFORMANCE PISTON CORE FOR A MAGNETORHEOLOGICAL DAMPER

TECHNICAL FIELD

This invention relates generally to the field of magnetorheological fluid dampers, and in particular, to high-performance piston cores for use in magnetorheological fluid dampers.

BACKGROUND OF THE INVENTION

Magnetorheological fluid dampers have found a number of practical applications in automotive suspensions, clutches, engine mounts, vibration control units, earthquake proofing equipment, and robotic systems. The magnetorheological fluid in the damper changes key rheological properties, such as yield stress or viscosity, in response to a magnetic flux to adjust the damping characteristics of the damper.

FIG. 1 shows a cutaway perspective view for a magnetorheological (MR) piston including a piston core. Magnetorheological (MR) dampers have a cylinder (not shown) containing an MR fluid and an MR piston 10 slidably engaging the inner diameter of the cylinder. In this example, the MR fluid passes through a flow gap 12 between the inner surface of solid piston ring 14 and the outer surface formed by piston core 16 and coil winding 18. The magnetic field in the flow gap 12 is changed by varying the electric current in the coil winding 18, which changes the yield stress of the MR fluid in the flow gap 12. This changes the damping characteristics of the MR damper. A rod 20 is attached to the MR piston 10 and extends outside the cylinder. The cylinder and the rod 20 are attached to separate structures to dampen relative motion of the two structures along the direction of MR piston travel.

FIG. 2, in which like elements share like reference numbers with FIG. 1, shows a magnetic flux density distribution plot for a magnetorheological (MR) piston including a piston core. The magnetic flux density in the piston core 16 includes a high flux density region 22 and a low flux density region 24. The high flux density region 22 is typically located between the longitudinal axis of the piston core 16 and the coil winding 18. When the material in the high flux density region 22 is magnetically saturated, the flux density in the flow gap 12 is limited, regardless of the electric current through the coil winding 18. The high flux density region 22 restricts the magnetic flux through the central portion of the core, acting as a flux bottleneck, and thus limits the dynamic range and performance of the MR damper.

Several approaches have been implemented or suggested to work around the problem of limitation of the flux density in the flow gap due to magnetic saturation, using changes to the piston core materials, the piston core geometry, or the MR fluid.

One approach has been to build the whole piston core from a high-performance magnetic alloy which saturates at a flux density higher than that encountered in the MR damper. The cost of suitable high-performance magnetic alloys, such as Cobalt steel and Vanadium/Cobalt steel (Permendur), greatly exceeds the cost of low-carbon steel used presently. The increased cost makes this approach uneconomical for mass-produced items, such as automotive dampers, which are produced in large numbers and for which even a small fractional cost determines profit or loss.

Another approach has been to change the piston core geometry to increase the flux density in the flow gap, such as by reducing the width of the flow gap. This increases the flux density in the flow gap for a given number of ampere-turns in the coil winding, but precludes desirable damper configurations. The flow resistance of the flow gap depends on its width, so reducing the width of the flow gap increases flow resistance. Flow resistance at low or no coil winding current is higher than desirable, precluding this approach.

Yet another approach has been to increase the iron content of the MR fluid to increase its yield stress for a given flux density in the flow gap. This causes a number of materials problems, such as particle separation, particle sedimentation, increased abrasion, and increased viscosity. The increased iron content causes operational difficulties, such as greater magnetic field loss and reduction in damper dynamic range. The higher viscosity also requires larger flow gap widths in order to maintain acceptable low damping forces when the coil current is low or zero. The required increased gap width in turn reduces the flux density in the flow gap, thus negating the benefits of increased iron content in the fluid. Increased iron content also increases MR fluid cost. The many problems resulting from increased iron content in the MR fluid make this approach undesirable.

Accordingly, it would be desirable to have a high-performance piston core for a magnetorheological damper that overcomes the disadvantages described.

SUMMARY OF THE INVENTION

One aspect of the present invention provides a high-performance piston core for a magnetorheological damper that provides a high magnetic flux density in the flow gap.

Another aspect of the present invention provides a high-performance piston core for a magnetorheological damper that avoids magnetic saturation in the flux bottleneck.

Another aspect of the present invention provides a high-performance piston core for a magnetorheological damper that is economical.

Another aspect of the present invention provides a high-performance piston core for a magnetorheological damper that uses conventional piston core geometries.

Another aspect of the present invention provides a high-performance piston core for a magnetorheological damper that uses conventional magnetorheological fluids.

Another aspect of the present invention provides a high-performance piston core for a magnetorheological damper that allows design flexibility.

The invention provides the foregoing and other features, and the advantages of the invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

BRIEF DESCRIPTION OF THE DRAWINGS

FIGS. 3–5 show an exploded perspective, a cross section, and a flow gap radial flux density plot, respectively, for a high-performance piston core for a magnetorheological damper made in accordance with the present invention;

DESCRIPTION OF THE PREFERRED EMBODIMENT

The high-performance piston core for a magnetorheological damper of the present invention attains the magnetic characteristics of a piston core made completely of high-performance magnetic material while minimizing the amount of high-performance magnetic material actually used. The high-performance piston core provides greater flux density in the damper flow gap, greater damping force, and greater damper dynamic range. The high-performance piston core also provides improved dynamic response through the reduced persistence of eddy currents when coil current is changed.

Figure 1:
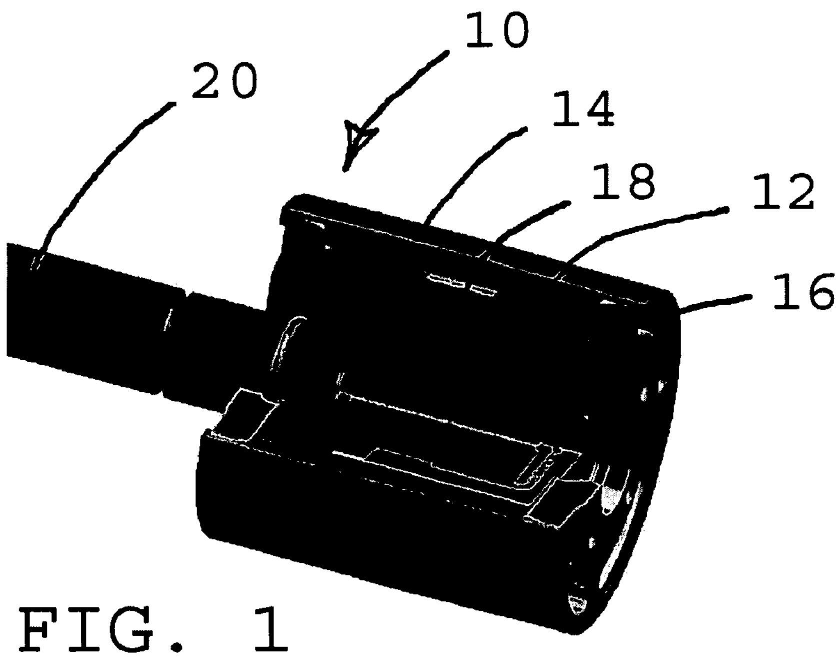
FIGS. 1 & 2 show a cutaway perspective and a magnetic flux density distribution plot, respectively, for a magnetorheological (MR) piston including a piston core.
Figure 2:
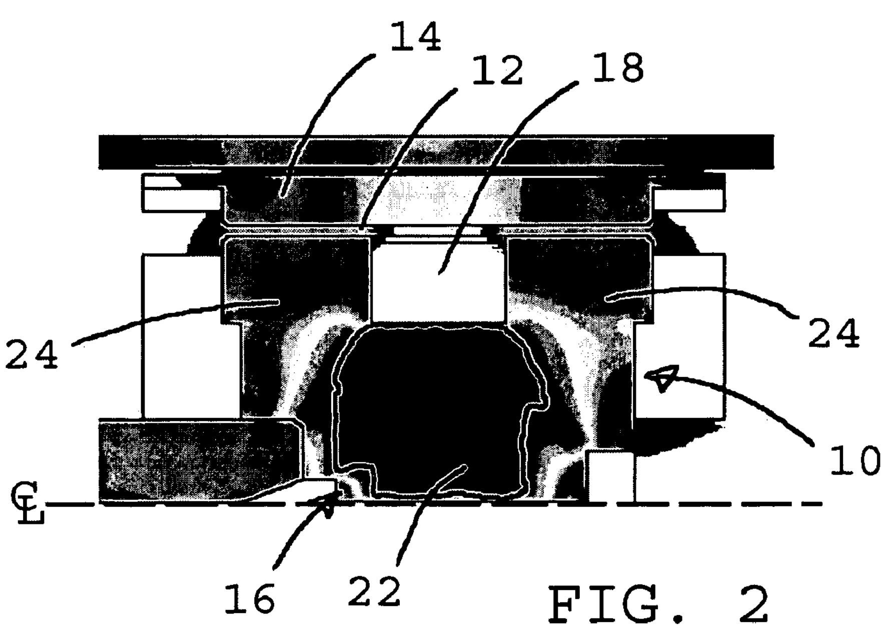
Figure 3:
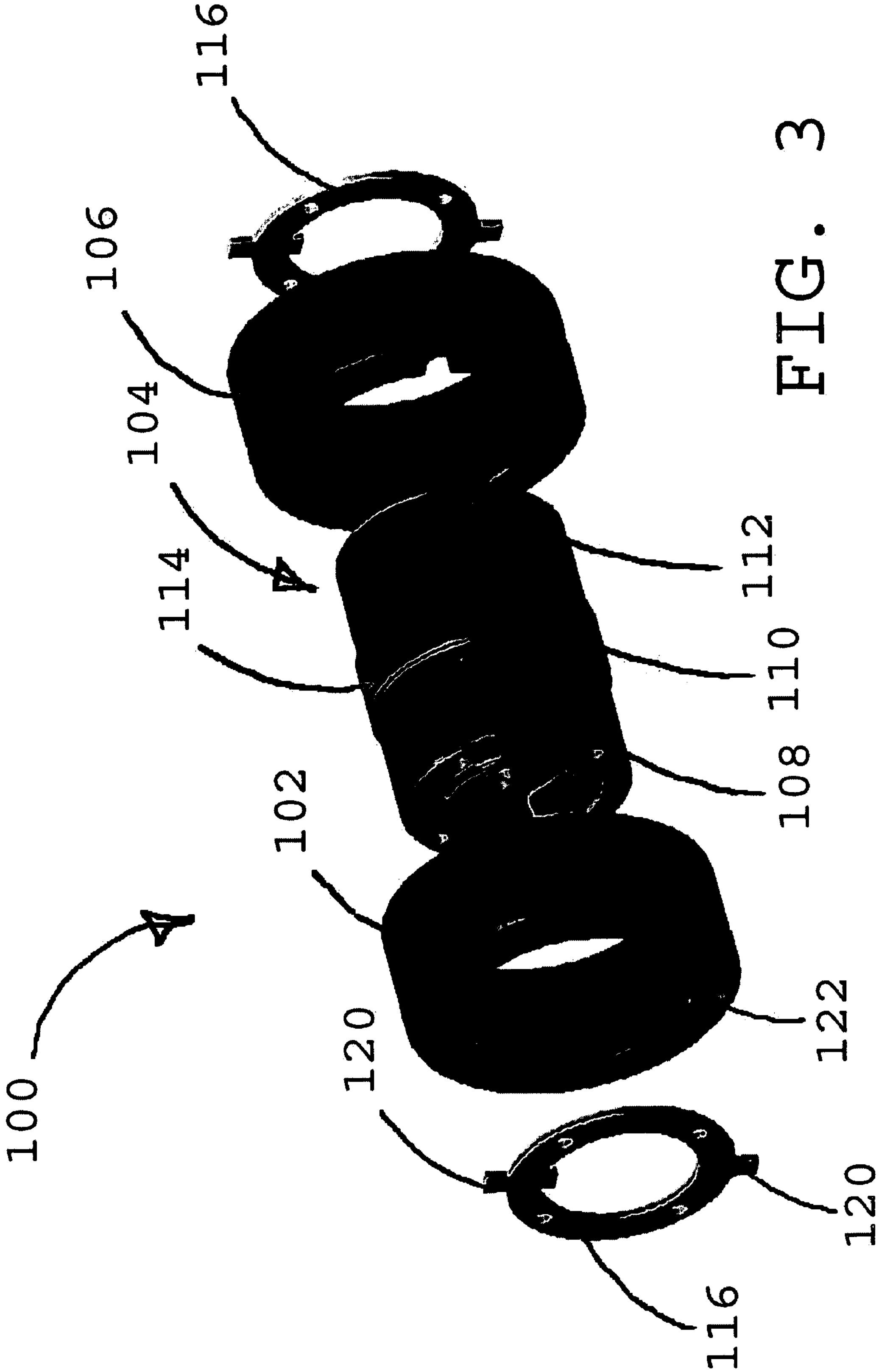

FIGS. 3–5 show an exploded perspective, a cross section, and a flow gap radial flux density plot, respectively, for a high-performance piston core for a magnetorheological damper. The piston core uses high-performance magnetic materials in flux bottleneck directly below the coil winding gap and in the piston cylinders to reduce the magnetic reluctance in the flux bottleneck.

FIGS. 3 & 4, in which like elements share like reference numbers, show a piston core 100 including a first ring 102, an inner core 104, and a second ring 106. The inner core 104 has a first end 108, a piston center 110, and a second end 112. The first ring 102 and the first end 108 form a first piston cylinder 124; the second ring 106 and the second end 112 form a second piston cylinder 126. The piston center 110 is longitudinally disposed between and magnetically couples the first piston cylinder 124 and the second piston cylinder 126. The piston center 110 includes a middle ring 114 machined on its outer perimeter. The rings 102, 106 and the middle ring 114 define a coil winding gap 118 for winding the coil winding (not shown). Endpieces 116 are used to secure the rings 102, 106 to the inner core 104.

The rings 102, 106 are made of a relatively inexpensive conventional magnetic material, such as low-carbon steel, SAE 1010 steel, or the like. Other low-cost materials suitable for fabricating the rings 102, 106 include SAE 1006 steel, SAE 1008 steel, SAE 1018 steel, and SAE 1020 steel, as well as sintered powdered iron materials. The inner core 104 is made of a high-performance magnetic material, such as Cobalt steel (CoFe), Silicon steel (SiFe), Vanadium/Cobalt steel (Permendur), alloys thereof, or the like. High-performance magnetic materials come in different compositions depending on the desired saturation flux density, conductivity, hysteresis loop and corrosion resistance, and are well known to those practiced in the art. The high-performance magnetic materials, particularly Cobalt steel alloys, require much lower ampere-turns to reach a given flux density and saturate at a higher flux density than the conventional magnetic materials. The high-performance magnetic materials typically have a high permeability. Silicon steel (SiFe) has a saturation flux density similar to SAE 1010 steel. Use of SiFe alloys reduces both the induced eddy current effects and the ampere-turn requirements of the coil winding because of the alloys' higher magnetic permeability and low electrical conductivity.

The less expensive conventional magnetic material is used in the rings 102, 106, which are in the low flux region 132. The more expensive high-performance magnetic material is used in the flux bottleneck 130 to reduce the magnetic reluctance of the flux bottleneck 130. The reduced reluctance in the flux bottleneck 130 reduces the ampere-turns required to generate the required gap flux density to levels within the thermal limits of the coil. This optimizes the use of the more expensive high-performance magnetic material by reducing the amount of high-performance magnetic material by 45 to 50 percent from the amount used if the piston core were made of high-performance magnetic material alone, while maintaining a high gap flux density.

The flux density in the flux bottleneck 130 is typically greater than 1.5 Tesla and can be as high as 2 Tesla. The flux density in the low flux region 132 is typically less than 1 Tesla. In the example shown in FIG. 4, the flux bottleneck 130 is in the piston center 110 and part of the ends 108, 112. Those skilled in the art will appreciate that the flux bottleneck 130 can be in different portions of the piston core 100. The flux bottleneck 130 can be within the piston center 110 or can be in the piston center 110 and the ends 108, 112. The flux bottleneck 130 can also extend into the rings 102, 106.

The piston core 100 is assembled by press fitting the rings 102, 106 over the ends 108, 112 of the inner core 104 until the middle ring 114 prevents further travel. The endpieces 116 prevent the rings 102, 106 from rotating relative to the inner core 104 due to the complementary lug 120 and recess 122 on the endpieces 116 and the rings 102, 106, respectively. The rings 102, 106 and the middle ring 114 define a coil winding gap 118 over the piston center 110 of the inner core 104 in which the coil winding (not shown) is wound. In an alternative embodiment, the middle ring 114 is omitted and the axial length of the rings 102, 106 alone used to define the coil winding gap 118. In another alternative embodiment, glue or adhesive is used in addition to the press-fit to hold the piston core 100 together.

FIG. 5 is a plot of the radial flux density in the fluid gap as a function of axial position for a piston core made of conventional low-carbon steel, for a piston core made entirely of high-performance magnetic material, and for the piston core 100 of FIGS. 3 & 4 made of conventional low-carbon steel and high-performance magnetic material. FIG. 5 illustrates that the gap flux density for the piston core 100 is greater than the gap flux density of the conventional low-carbon steel piston core, and equal to the gap flux density of the high-performance magnetic material piston core. The axial position corresponds to the first piston cylinder 124, the piston center 128, and the second piston cylinder 126.

FIG. 5 presents the results of finite element analysis for three types of piston cores having the same dimensions. First curve 140, marked by x's (x), is the baseline case of a conventional low-carbon steel piston core made of SAE 1010 steel. Second curve 142 is marked with plusses (+) for the all high-performance magnetic material (HPMM) piston core and circles (○) for the dual material piston core 100 of FIGS. 3 & 4.

The improvement in the gap flux density can be seen by comparing the first curve 140 for the conventional low-carbon steel piston core and the second curve 142 for the all HPMM piston core. The all HPMM piston core increases gap flux density in the region of the piston cylinders 124, 126 by more than 10 percent over the gap flux density from the conventional low-carbon steel piston core made of SAE 1010 steel. A higher gap flux density produces a higher damping force for a given coil winding current, increasing the damper dynamic range.

The second curve 142 applies to both the all HPMM piston core made completely of high-performance magnetic material and the dual material piston core 100 of FIGS. 3 & 4. Thus, the dual material piston core 100, which limits the use of the high-performance magnetic material to the flux bottleneck, maintains the higher gap flux density of the all HPMM piston core while optimizing the use of the more expensive high-performance magnetic material.

Figure 6:
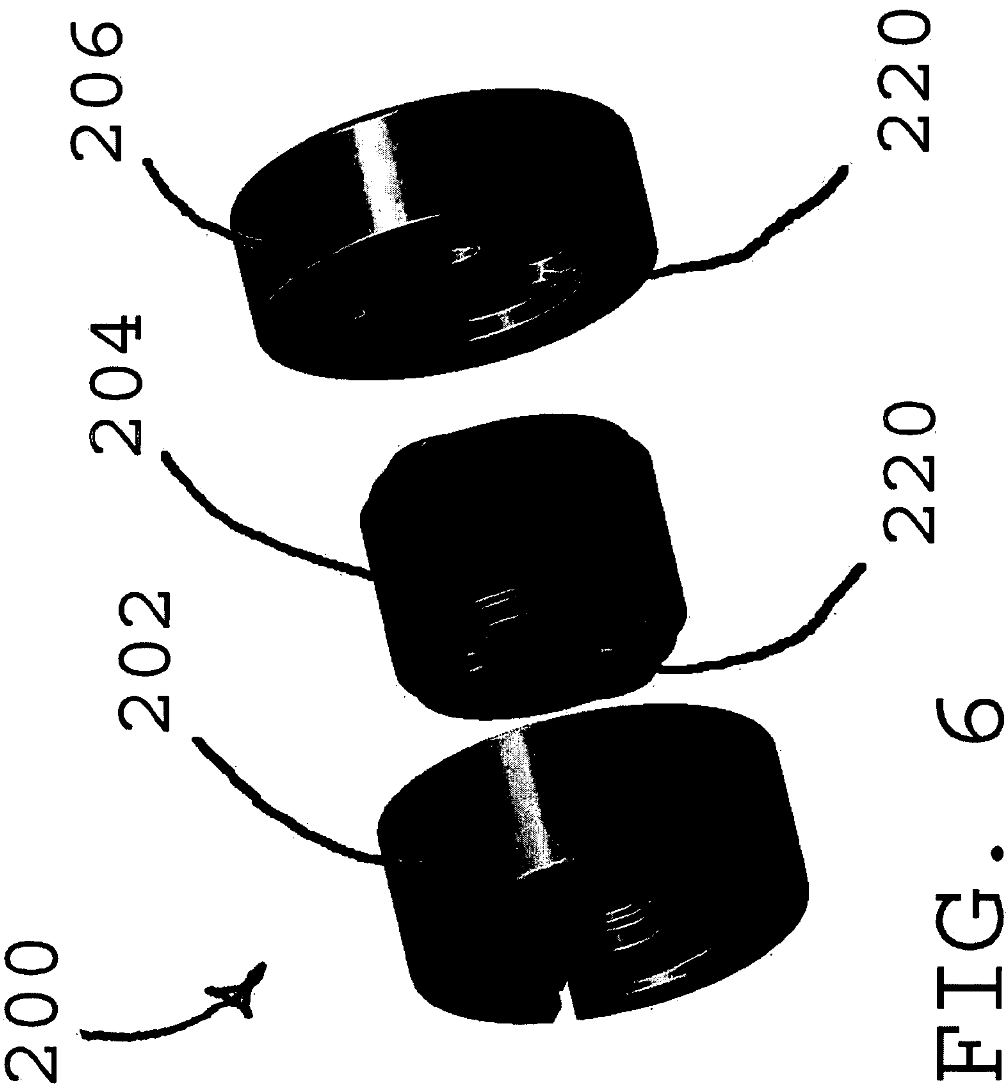
FIGS. 6 & 7 show an exploded perspective and a cross section, respectively, of another embodiment for a high-performance piston core for a magnetorheological damper made in accordance with the present invention.
Figure 7:
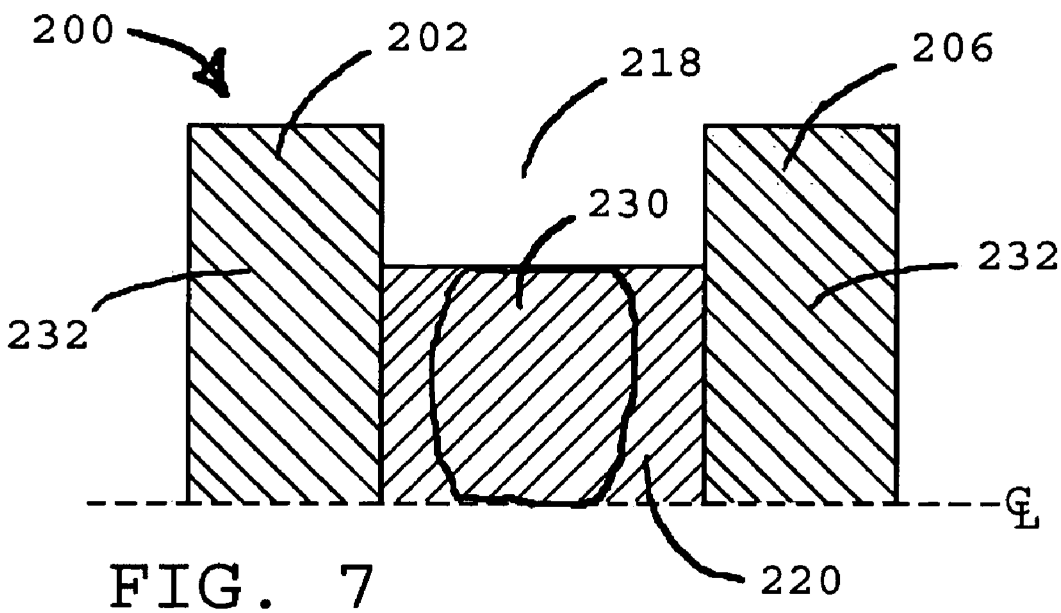

FIGS. 6 & 7 show an exploded perspective and a cross section, respectively, of another embodiment for a high-performance piston core for a magnetorheological damper. The piston core uses high-performance magnetic materials in flux bottlenecks below the coil winding gap to avoid magnetic saturation.

FIGS. 6 & 7, in which like elements share like reference numbers, show a piston core 200 including a first piston cylinder 202, a piston center 204, and a second piston cylinder 206. The piston center 204 is longitudinally disposed between and magnetically couples the first piston cylinder 202 and the second piston cylinder 206. The piston cylinders 202, 206 and the piston center 204 define a coil winding gap 218 for winding the coil winding (not shown).

The piston cylinders 202, 206 are made of a relatively inexpensive conventional magnetic material, such as low-carbon steel, SAE 1010 steel, or the like. Other low-cost materials suitable for fabricating the piston cylinders 202, 206 include SAE 1006 steel, SAE 1008 steel, SAE 1018 steel, and SAE 1020 steel, as well as sintered powdered iron materials. The piston center 204 is made of a high-performance magnetic material, such as Cobalt steel (CoFe), Silicon steel (SiFe), Vanadium/Cobalt steel (Permendur), alloys thereof, or the like. High-performance magnetic materials come in different compositions depending on the desired saturation flux density, conductivity, hysteresis loop and corrosion resistance, and are well known to those practiced in the art. The high-performance magnetic materials, particularly Cobalt steel alloys, require much lower ampere-turns to reach a given flux density and saturate at a higher flux density than the conventional magnetic materials. The high-performance magnetic materials typically have a high permeability. Silicon steel (SiFe) has a saturation flux density similar to SAE 1010 steel. Use of SiFe alloys reduces both the induced eddy current effects and the ampere-turn requirements of the coil winding because of the alloys' higher magnetic permeability and low electrical conductivity.

The less expensive conventional magnetic material is used in the piston cylinders 202, 206, which are in the low flux region 232. The more expensive high-performance magnetic material is used in the flux bottleneck 230 to reduce the magnetic reluctance of the flux bottleneck 230. The reduced reluctance in the flux bottleneck 230 reduces the ampere-turns required to generate the required gap flux density to levels within the thermal limits of the coil. This optimizes the use of the more expensive high-performance magnetic material by reducing the amount of high-performance magnetic material by 70 to 75 percent from the amount used if the piston core were made of high-performance magnetic material alone, while maintaining a high gap flux density.

The flux density in the flux bottleneck 230 is typically greater than 1.5 Tesla and can be as high as 2 Tesla. The flux density in the low flux region 232 is typically less than 1 Tesla. In the example shown in FIG. 7, the flux bottleneck 230 is within the piston center 204. Those skilled in the art will appreciate that the flux bottleneck 230 can extend into the piston cylinders 202, 206 as well.

The piston core 200 is assembled by press-fitting the piston cylinders 202, 206 on the piston center 204. The piston cylinders 202, 206 and the piston center 204 define a coil winding gap 218 in which the coil winding (not shown) is wound. The piston cylinders 202, 206 and the piston center 204 include complementary engagement fittings 220 to align the various parts during assembly and prevent the parts from rotating relative to each other during operation. In an alternative embodiment, the complementary engagement fittings 220 are omitted. In another alternative embodiment, glue or adhesive is used in addition to the press-fit to hold the piston core 200 together.

Those skilled in the art will appreciate that the dimensions of the piston core depend on the particular application in which the piston core is used. In one example, a 36 millimeter long piston core as shown in FIGS. 6 & 7 with a coil winding of 100 turns and a flow gap of 0.7 millimeter has a piston center 21 millimeter long and 22 millimeter in diameter and piston cylinders 8 millimeter thick and 28 millimeter in diameter. In another example, a 36 millimeter long piston core as shown in FIGS. 6 & 7 with a coil winding of 80 turns and a flow gap of 0.7 millimeter has a piston center 14.8 millimeter long and 22.5 millimeter in diameter and piston cylinders 11.1 millimeter thick and 28.3 millimeter in diameter.

Figure 8:
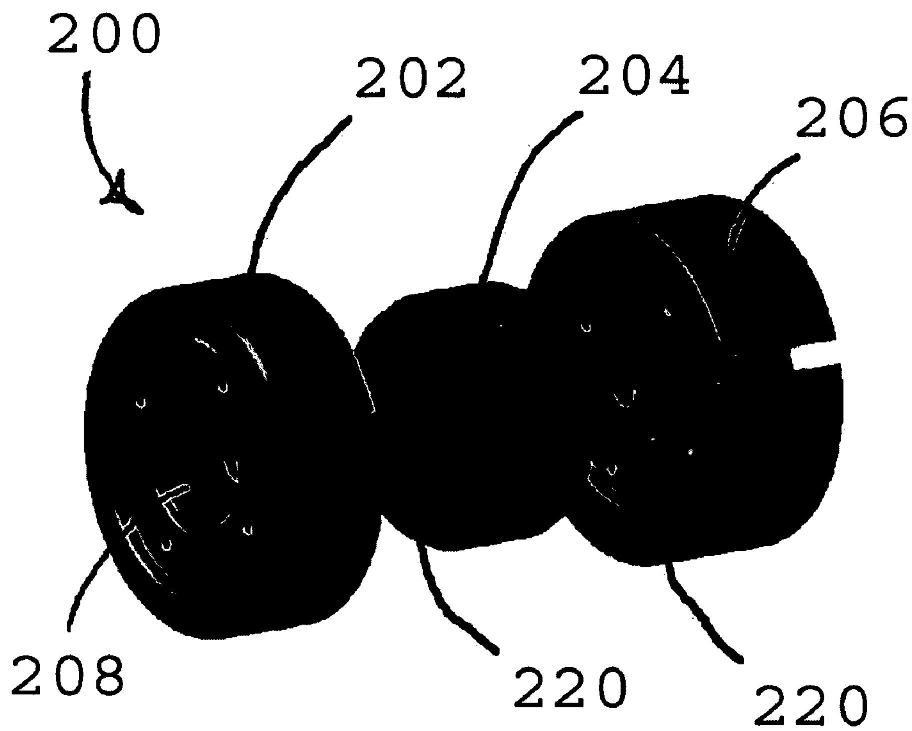
FIGS. 8 & 9 show an exploded perspective and a cross section, respectively, of yet another embodiment for a high-performance piston core for a magnetorheological damper made in accordance with the present invention.
Figure 9:
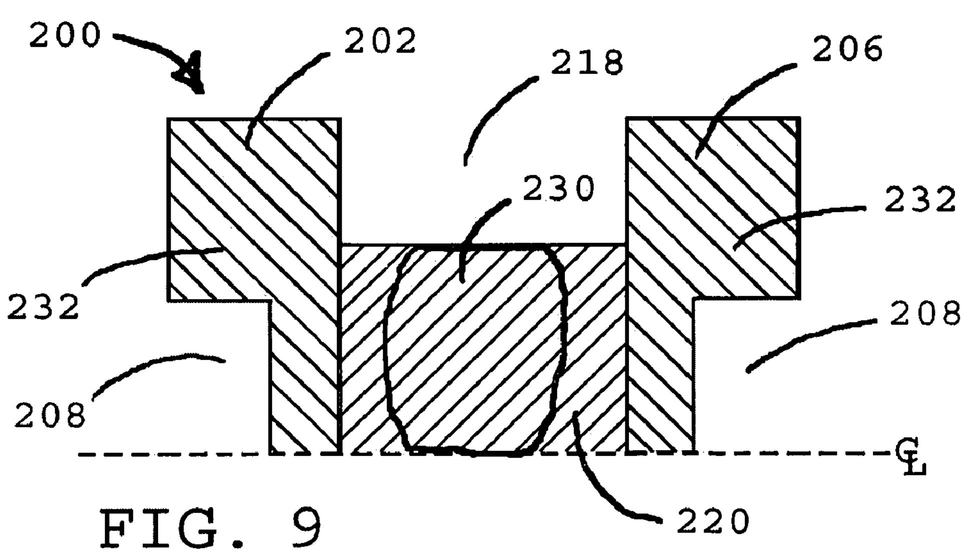

FIGS. 8 & 9, in which like elements share like reference numbers with FIGS. 7 & 8, show an exploded perspective and a cross section, respectively, of yet another embodiment for a high-performance piston core for a magnetorheological damper. A piston core 200 includes a first piston cylinder 202, a piston center 204, and a second piston cylinder 206. The piston center 204 is longitudinally disposed between and magnetically couples the first piston cylinder 202 and the second piston cylinder 206. The piston cylinders 202, 206 and the piston center 204 define a coil winding gap 218 for winding the coil winding (not shown). The first piston cylinder 202 and the second piston cylinder 206 each include a cutout 208, which reduces the amount of material required to fabricate the piston cylinders 202, 206.

Figure 10:
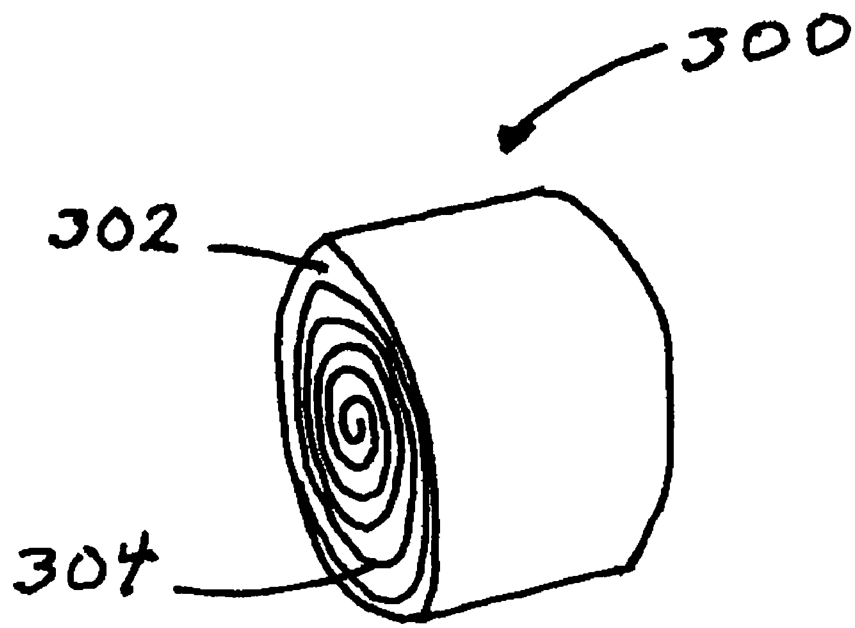
FIGS. 10 & 11 show perspectives of a spiral wound and plate laminated piston center, respectively, for a high-performance piston core for a magnetorheological damper made in accordance with the present invention.
Figure 11:
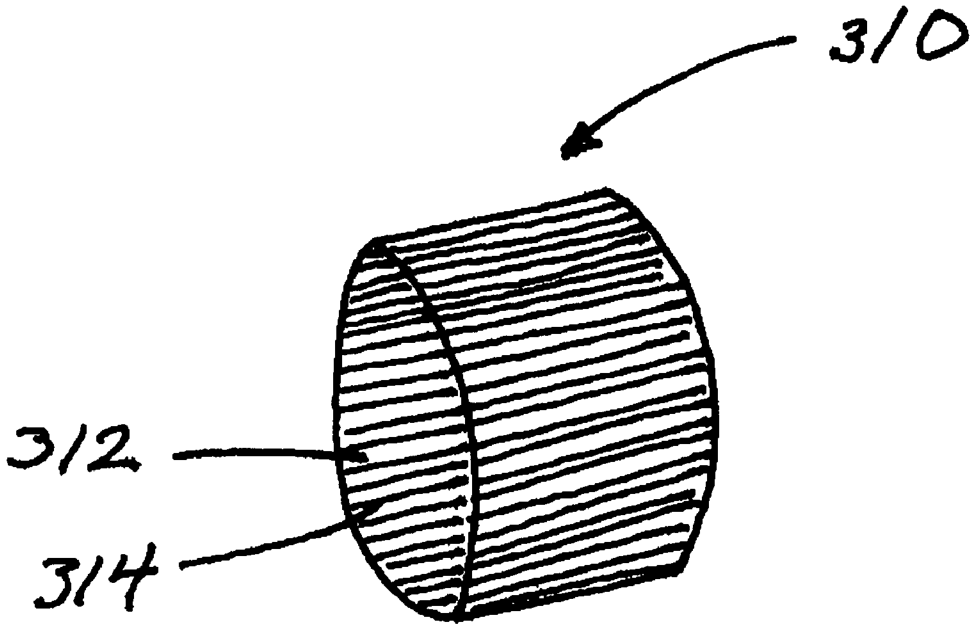

FIGS. 10 & 11 show perspectives of a spiral wound and plate laminated piston center, respectively, for a high-performance piston core for a magnetorheological damper. In this embodiment, the piston center is laminated of high-performance magnetic material with high dielectric material between adjacent laminates. The laminated piston center permits faster decay of eddy currents relative to a solid piston core. This in turn allows faster response to change of coil current. The laminated piston center takes advantage of well-known techniques and readily available materials available in the art of motor, transformer, and solenoid manufacture. The laminated design can be used for the piston core or the inner core of FIG. 3.

Referring to FIG. 10, the spiral wound piston center 300 is formed of a tape 302 of high-performance magnetic material wound into a cylinder. The voids 304 between the adjacent wraps of the tape 302 are filled with insulating glue having a high dielectric constant, such as is well known to those in the art of motor, transformer, and solenoid manufacture.

Referring to FIG. 11, the plate laminated piston center 310 is formed of plates 312 of high-performance magnetic material laid on each other and glued together, then machined into a cylinder. The voids 314 between the adjacent plates 312 are filled with insulating glue having a high dielectric constant, such as is well known to those in the art of motor, transformer, and solenoid manufacture.

Figure 12:
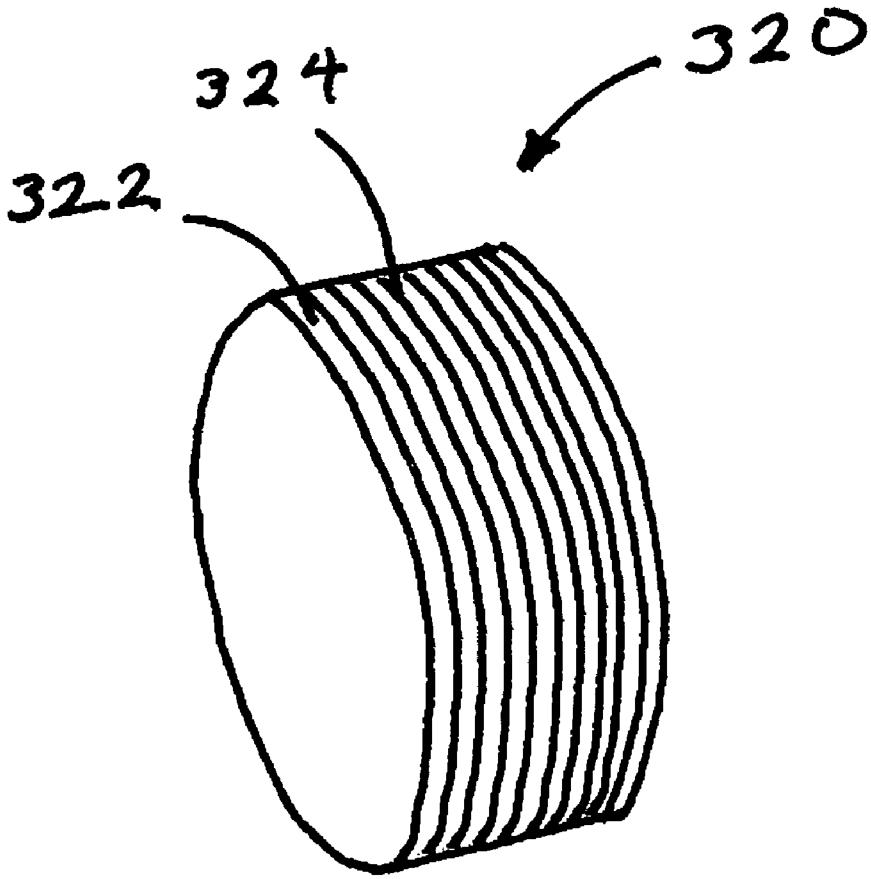
FIG. 12 shows a perspective of a laminated piston cylinder for a high-performance piston core for a magnetorheological damper made in accordance with the present invention.

FIG. 12 shows a perspective of a laminated piston cylinder for a high-performance piston core for a magnetorheological damper. The laminated piston cylinder 320 is formed of a stack of discs 322 of conventional magnetic material aligned perpendicular to the long axis of the piston center, with insulating glue having a high dielectric constant filling the voids 324 between the adjacent discs. The laminated design can be used for the piston cylinder by stacking discs or for the rings of FIG. 3 by stacking circles with center cutouts. In an alternative embodiment, the rings are formed by stacking discs and machining out the center.

Although the examples in the description above are directed toward a cylindrical piston core, those skilled in the art will appreciate that a number of shapes are possible. Different shapes are suited to particular applications. The piston core can have a cross section which is square, rectangular, polygonal, or irregular as desired.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A high-performance piston core, comprising:

a first piston cylinder;

a second piston cylinder, and a piston center, the piston center longitudinally disposed between and magnetically coupling the first piston cylinder and the second piston cylinder, wherein the piston center is made of high-performance magnetic material.

2. The piston core of claim 1 wherein the high-performance magnetic material is selected from the group consisting of Cobalt steel (CoFe), Silicon steel (SiFe), Vanadium/Cobalt steel (Permendur), and alloys thereof.

3. The piston core of claim 1 wherein the first piston cylinder is made of conventional magnetic material.

4. The piston core of claim 3 wherein the conventional magnetic material is selected from the group consisting of low-carbon steel, SAE 1010 steel, SAE 1006 steel, SAE 1008 steel, SAE 1018 steel, SAE 1020 steel, and sintered powdered iron materials.

5. The piston core of claim 3 wherein the second piston cylinder is made of a material selected from the group consisting of conventional magnetic material and high-performance magnetic material.

6. The piston core of claim 1 further comprising an end longitudinally attached and magnetically coupled to the piston center, wherein the first piston cylinder comprises a ring disposed about the end.

7. The piston core of claim 6 wherein the end is made of the high-performance magnetic material.

8. The piston core of claim 1 wherein the piston center is laminated.

9. The piston core of claim 1 wherein the first piston cylinder is laminated.

10. A high-performance piston core, comprising:

an inner core, the inner core having a first end, a piston center, and a second end;

a first ring disposed about the first end; and a second ring, the second ring being disposed about the second end;

wherein the inner core is made of a high-performance magnetic material.

11. The piston core of claim 10 wherein the high-performance magnetic material is selected from the group consisting of Cobalt steel (CoFe), Silicon steel (SiFe), Vanadium/Cobalt steel (Permendur), and alloys thereof.

12. The piston core of claim 10 wherein the first ring is made of conventional magnetic material.

13. The piston core of claim 12 wherein the conventional magnetic material is selected from the group consisting of low-carbon steel, SAE 1010 steel, SAE 1006 steel, SAE 1008 steel, SAE 1018 steel, SAE 1020 steel, and sintered powdered iron materials.

14. The piston core of claim 12 wherein the second ring is made of a material selected from the group consisting of conventional magnetic material and high-performance magnetic material.

15. The piston core of claim 10 further comprising a middle ring about the inner core 104.

16. The piston core of claim 10 wherein the inner core is laminated.

17. The piston core of claim 10 wherein the first ring is laminated.

18. A high-performance piston core, comprising:

a first piston cylinder;

a second piston cylinder; and a piston center, the piston center being longitudinally disposed between and magnetically coupling the first piston cylinder and the second piston cylinder, the piston center including a flux bottleneck;

wherein the flux bottleneck is made of high-performance magnetic material.

19. The piston core of claim 18 wherein the high-performance magnetic material is selected from the group consisting of Cobalt steel (CoFe), Silicon steel (SiFe), Vanadium/Cobalt steel (Permendur), and alloys thereof.

20. The piston core of claim 18 wherein the flux bottleneck has a flux density greater than 1.5 Tesla.

21. The piston core of claim 18 wherein the first piston cylinder includes a low flux density region and the low flux density region is made of conventional magnetic material.

22. The piston core of claim 21 wherein the low flux density region has a flux density less than 1 Tesla.

23. The piston core of claim 18 wherein the first piston cylinder includes a second flux bottleneck and the second flux bottleneck is made of the high-performance magnetic material.

24. The piston core of claim 23 wherein the high-performance magnetic material is selected from the group consisting of Cobalt steel (CoFe), Silicon steel (SiFe), Vanadium/Cobalt steel (Permendur), and alloys thereof.

25. A high-performance piston core, comprising:

a first piston cylinder, the first piston cylinder including a flux bottleneck;

a second piston cylinder; and a piston center, the piston center being longitudinally disposed between and magnetically coupling the first piston cylinder and the second piston cylinder;

wherein the flux bottleneck is made of high-performance magnetic material.

26. The piston core of claim 25 wherein the high-performance magnetic material is selected from the group consisting of Cobalt steel (CoFe), Silicon steel (SiFe), Vanadium/Cobalt steel (Permendur), and alloys thereof.

* * * * *